Jan. 20, 1942.   C. L. PAULUS   2,270,336
VIBRATION ABSORBER
Filed May 13, 1940
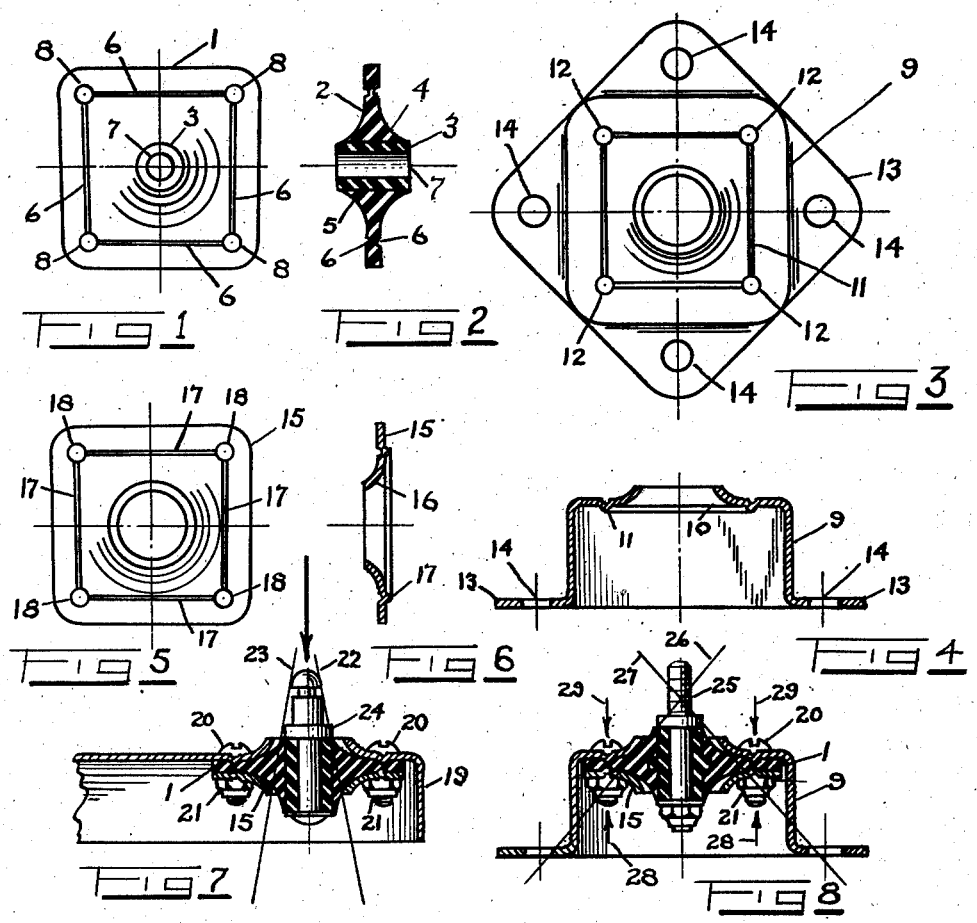
INVENTOR
CHARLES L. PAULUS
BY
ATTORNEYS Patented Jan. 20, 1942

2,270,336

UNITED STATES PATENT OFFICE 2,270,336

VIBRATION ABSORBER

Charles L. Paulus, Dayton, Ohio

Application May 13, 1940, Serial No. 334,843

2 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to vibration absorbers, commonly called "shock mounts," and particularly to the type of resilient mounting employed on aircraft for supporting various delicate items of equipment such as radio apparatus, instruments and the like, to absorb and damp high frequency vibrations as well as low frequency vibrations and shock loads which occur in flying in bumpy air conditions and landing.

My invention includes various types of vibration absorbing equipment that can be fabricated with the proper resilience to absorb vibration of the high frequency ranges and yet accommodate low frequency, or "shake," and extreme overloads this being accomplished by absorbing high frequency and low amplitude vibrations principally through shear stresses in the resilient material and absorbing shock loads primarily through compressive stresses in the resilient material, the resultant line of action of the compressive stresses becoming more nearly parallel with the line of the applied load as the load is increased.

The invention includes means for readjusting the vibration absorber to stiffen the resilient material, thus correcting for the "sag" due to age of said material throughout the life of the equipment.

The structural fabrication of the resilient member includes the use of like material such as rubber or synthetic rubber of a plurality of hardnesses formed into a homogeneous unit to provide a hard core and a resilient outer rim to make up the vibration absorbing member.

My invention includes novel means for clamping the vibration absorbing member between the mounting plates or forms, so as to firmly grip the resilient portion, prevent slippage, and evenly distribute the load.

Further objects having reference to the foregoing and the detail construction thereof will be disclosed in the course of the following description, and by reference to the accompanying drawing, illustrating the invention. In the figures all like numerals indicate like parts.

Figure 1 is a plan view of the resilient member.

Figure 2 is a side sectional view of the resilient member.

Figure 3 is a plan view of a representative formed mounting member.

Figure 4 is a side sectional view of a representative formed mounting member.

Figure 5 is a plan view of a representative formed clamping plate.

Figure 6 is a side sectional view of a representative formed mounting plate.

Figure 7 is a side sectional view of one form of vibration absorber, showing the equipment under heavy or unusual load.

Figure 8 shows a side sectional view of a vibration absorber employing a formed member or cup.

In general a vibration absorbing device must provide a high degree of resiliency and, at the same time, support the weight of the equipment concerned. The degree of accuracy of balance required for proper function has not been provided in the art, as with the conventional equipment used for vibration absorption, it is necessary to compromise between the exact resiliency required and additional load carrying capacity, necessitated by unusual loads. For example, instrument, radio equipment, and the like, mounted in aircraft may be damaged by the high frequency vibration generated by the engine or engines. Therefore, all this type of equipment is usually resiliently mounted. Under unusual conditions, such as rough air or hard landing, the above equipment is subjected to "thump" loads which means that vibration absorbers of conventional type must be selected so as to accommodate the ordinary (high frequency) and the unusual (thump). My invention accommodates both of the above conditions by providing a soft, highly resilient, mount for high frequency vibration absorption and includes means for stiffening the mount, or providing additional load carrying capacity, as greater load is applied by "thump" of rough air or landing.

This additional capacity is provided by adjusting the radii which form the sides of the resilient member to coact with, but normally not to come in contact with, curved stop members formed integrally with or carried by the mounting plate and clamping plate respectively. By providing a smaller radius on the stop members, the direction of load absorption, and the area of resilient material in compression, are both changed toward increase of strength of the entire assembly proportional to increase in load. The above method of changing load carrying conditions can be applied to any type vibration absorber; i. e., combination tension-compression type, or compression type. In the latter type it is purely a question of the load supporting area being increased as load is added.

The degree of accuracy required in selecting the proper value of vibration absorber to suit the load conditions along with the different types required for various applications makes it desirable to provide this equipment in "kit" form. In conventional equipment each "shock" mount is made up as a unit, thus requiring a large and expensive stock to meet all load and design requirements. In use of the type vibration absorber shown and described, the individual parts can be stocked and combined to suit load conditions and design of adjacent parts, as used, thus greatly reducing the material which must be kept on hand to meet various conditions.

In the art of vibration absorption the material used loses its resilience with age; therefore, a shock mount properly selected at installation will deteriorate to a point where it will be too weak, some period of time, say one year, later. The conventional equipment makes no provision for this deterioration, and the only remedy is to remove and replace the affected parts. My invention includes means of quickly adjusting the resilience of the mount to precision balance either at installation or later, as deterioration sets in. This result is obtained by providing the curved stop members previously described, which in combination with the mounting screws makes it possible to reduce the angle of the load application and increase the volume of resilient material in compression by tightening said screws.

In the conventional "shock" mounts a metal bushing is often assembled, by adhesion, as a part of the resilient member. In most subsequent assemblies a stud is mounted in this bushing by use of a thread and nut. With this construction extreme care must be exercised, as if different metals are used at this point, electrolysis in combination with the effects of the chemicals used in processing the rubber or synthetic rubber resilient member makes it impossible to disassemble the parts after a period of time. This condition is removed in my invention by the use of like material for all parts of the resilient member. My invention provides perfect bond between parts and a gradient of flexibility will be obtained as the more resilient material will flow into the hard portion during the homogenizing process.

The conventional shock mounts are usually fabricated by joining metal and rubber by adhesion. My invention includes the provision of grooves in the resilient member coacting with extrusions on the surface of the formed mounting member and clamping plate. This arrangement provides even distribution of the load over the resilient member and prevents slippage of the latter during normal operation even though the mounting bolts are not tightened to extreme position.

Although several different types of vibration absorbers are shown and described, I do not mean to limit my invention to any size, proportion, or kind of device of this type, nor do I mean to limit my invention to any specific material or materials for the construction of the resilient member, or the mounting member, or the clamping plate, or the spring, or any other part or parts of the device.

Referring now to Figs. 1 and 2, the reference numeral 1 generally indicates a resilient member having a resilient portion 2 made of natural or synthetic rubber bonded to a centrally disposed hard bushing 3 made of like material. The sides of the resilient member are tapered from the bushing portion outward towards the marginal edges of the resilient member as indicated by the respective radii 4 and 5, Fig. 2. The resilient member 1 is provided on each side thereof, adjacent the marginal edges, with a groove 6, which is employed as a means for anchoring the edges of the resilient member in a manner hereinafter more fully described. The hard rubber bushing 3 is provided with a central bore 7 adapted to receive a load-supporting member and the resilient member is pierced with a suitable number of holes 8 adjacent its marginal edges to receive clamping screws.

The resilient member 1 may be employed in conjunction with one type of mounting support member such as illustrated in Figs. 3 and 4, in which the mounting member comprises a pressed metal cup 9, having a centrally disposed aperture formed therein with the edges of the aperture flanged or bell-mouthed to form a curved stop member indicated by the reference numeral 10 (Fig. 4). It is also provided with an extrusion 11 which is adapted to serve as a retaining member cooperated with the groove 6 of the resilient member 1 (Fig. 1) to prevent lateral slipping of the latter. The upper wall of mounting member is pierced with holes 12 to receive clamping screws and the lower edges of the mounting member are turned up to form the mounting ears 13, which are pierced by the holes 14 to receive the necessary mounting bolts.

The resilient member 1 is also used in conjunction with a clamping mmber 15, illustrated in Figs. 5 and 6, the clamping member being generally similar to the upper portion of the mounting member and comprising a rectangular plate having a central bell-mouthed aperture curved as indicated by the reference numeral 16 to form a stop member and provided with an extrusion 17, similar to the extrusion 11 of the housing member 9. The clamping plate is also provided with holes 18 adjacent its marginal edges adapted to receive clamping screws.

Fig. 7 illustrates one form of my improved resilient mounting in which the mounting member comprises a base 19, formed as a mounting member in the same manner as the housing of Figs. 3 and 4, in which the resilient member 1 is clamped adjacent its marginal edges between the housing 19 and the clamping member 15 by means of screws 20 and locking nuts 21. A mounting stud 24 of conventional type is secured within the hard rubber bushing of the resilient member 1 and serves as a support for an instrument or other load employing a conventional slide fastener attaching means not shown. This figure illustrates the action of the resilient mount when subjected to a heavy load applied along the line indicated by the arrow and it will be seen that the curved portions of the clamping member 15 serve as a stop to limit the deflection of the load supporting member, and in so doing cause the rubber to be stressed in compression such that the resultant lines of action of the compressive stresses are along the lines 22 and 23 as indicated, these resultant lines of action making a small angle with the line of action of the applied load.

Fig. 8 illustrates the resilient member 1 of (Figs. 1 and 2) when assembled with the supporting member 9 (Figs. 3 and 4) and the clamping member 15 (Figs. 5 and 6), the load supporting member 25 of the threaded type being secured within the central bushing 3 of the resilient member in the manner previously described. This figure illustrates the position of the resilient member when subjected to a small initial load so that the curved flange of the clamping member is substantially out of contact with the corresponding adjacent face of the resilient member. The compressive stresses introduced into the resilient member 1 due to a down load applied to the load supporting member 25, have their resultant lines of action indicated by the lines 26 and 27, and it will be seen that these lines make a large angle with the center line of the applied load so that the compressive stresses are not effective as the primary means for supporting the load applied to member 25, shear stresses being relied upon to give a soft yielding load supporting action for light loads such as caused by high frequency vibrations. The action of the resilient member of the device of Fig. 8 under shock or heavy loads is identical with the action of the modification Fig. 7 above described. By adjustment of the clamping screws 20, as indicated by the lines 29, the rubber adjacent the marginal edges of the resilient member will be initially compressed, bringing a greater portion thereof into contact with the supporting and clamping members, thus reducing the volume of rubber subjected to shear stress and increasing the area of rubber initially subjected to compressive stress by the applied load. This adjustable clamping means serves to readjust the resilient characteristics of the resilient member either initially or after the mounting has been in use for a period of time and sagging has taken place. The drawing up of the clamping screws will cause the lines of resultant compressive stress in the rubber indicated by lines 26 and 27 to make a lesser angle about the line of the applied load and hence to increase the stiffness of the mounting to compensate for sag.

Upon observation of Figs. 7 and 8, it is apparent that I have provided a mounting which under light loads is highly resilient due to the fact that the resilient member is supported adjacent its marginal edges and has a large volume of rubber subjected to shearing stresses, giving a mount having very soft characteristics to thereby absorb high frequency vibrations, while if heavy loads are applied to the load supporting member in either direction of movement thereof, the curved stop portions 10 and 16 of the mounting and clamping members respectively will progressively increase the area of rubber subjected to compressive stresses and also decrease the angle of the resultant compressive stresses with respect to the line of action of the applied load, so that the component of the compressive stresses in a vertical plane will increase proportionately to the increase in load beyond a predetermined deflection of the resilient member, thus allowing the resilient member to absorb shock loads primarily by compressive stresses in the most efficient manner. It is thus seen that I have provided a mount which is highly resilient when subjected to light vibrational loads of high frequency and small amplitude, while possessing sufficient rigidity to absorb heavy shock loads applied in either direction of movement of the load supporting member.

Having disclosed and described my invention, I claim:

1. In a resilient mounting, a resilient member of rubber or like material having a centrally disposed load-supporting member secured thereto, a load-carrying member adapted to be marginally secured to the resilient member, means for securing the load-carrying member to the resilient member and comprising a clamping plate having a bell-shaped aperture, and means for adjustably clamping the marginal edge of the resilient member between the load-carrying member and the clamping plate whereby the initial area of the clamping plate in contact with the resilient member may be varied at will to change the ratio of shear stress and compression stress for different load conditions.

2. In a resilient mounting, a resilient member of rubber or like material having a centrally disposed load-supporting member secured thereto, a load-carrying member adapted to be marginally secured to the resilient member and having a bell-shaped aperture, means for securing the load-carrying member to the resilient member and comprising a clamping plate having a bell-shaped aperture, and means for adjustably clamping the marginal edge of the resilient member between the load-carrying member and the clamping plate whereby the initial areas of the load-carrying member and clamping plate in contact with the resilient member may be varied at will to change the ratio of shear stress and compression stress for different load conditions.

CHARLES L. PAULUS.